US008635626B2

(12) United States Patent
Jula et al.

(10) Patent No.: US 8,635,626 B2
(45) Date of Patent: Jan. 21, 2014

(54) MEMORY-AWARE SCHEDULING FOR NUMA ARCHITECTURES

(75) Inventors: Alin Jula, Mountain View, CA (US); Jan Karstens, Mannheim (DE); Alexander Froemmgen, Mannheim (DE)

(73) Assignee: SAP AG, Walldorf (DE)

( * ) Notice: Subject to any disclaimer, the term of this patent is extended or adjusted under 35 U.S.C. 154(b) by 173 days.

(21) Appl. No.: 12/981,143

(22) Filed: Dec. 29, 2010

(65) Prior Publication Data

US 2012/0174117 A1 Jul. 5, 2012

(51) Int. Cl.
*G06F 9/46* (2006.01)

(52) U.S. Cl.
USPC .......................................................... 718/105

(58) Field of Classification Search
USPC .......................................................... 718/105
See application file for complete search history.

(56) References Cited

U.S. PATENT DOCUMENTS

| | | | |
|---|---|---|---|
| 5,347,653 A | 9/1994 | Flynn et al. | |
| 5,504,879 A | 4/1996 | Eisenberg et al. | |
| 7,159,216 B2 * | 1/2007 | McDonald | 718/100 |
| 7,251,669 B1 | 7/2007 | Arora | |
| 7,418,560 B2 | 8/2008 | Wintergerst | |
| 7,599,841 B1 | 10/2009 | Koller et al. | |
| 7,730,027 B2 | 6/2010 | Willenborg et al. | |
| 7,836,028 B1 | 11/2010 | Agarwal et al. | |
| 2003/0191795 A1 * | 10/2003 | Bernardin et al. | 709/105 |
| 2004/0019891 A1 | 1/2004 | Koenen | |
| 2005/0138013 A1 | 6/2005 | Walker et al. | |
| 2006/0101391 A1 | 5/2006 | Ulke et al. | |
| 2011/0154346 A1 * | 6/2011 | Jula | 718/103 |
| 2012/0166164 A1 | 6/2012 | Reusch et al. | |

OTHER PUBLICATIONS

Extended EP Search Report for EP Application No. 11004932.7, mailed Dec. 16, 2011, 9 pages.
Broquedis, et al., "ForestGOMP: An Efficient OpenMP Environment for NUMA Architectures", International Journal of Parallel Programming, vol. 38, No. 5-6, May 30, 2010, pp. 418-439.
Broquedis, et al., "Scheduling Dynamic OpenMP Applications over Multicore Architectures", May 12, 2008, OpenMP in a New ERA of Parallelism, Lecture Notes in Computer Science, pp. 170-180.
Broquedis, et al., "hwloc: A Generic Framework for Managing Hardware Affinities in HPC Applications", 2010 18th Euromicro International Conference on Parallel, Distributed and Network-Based Processing (PDP), Feb. 17, 2010, pp. 180-186.

(Continued)

*Primary Examiner* — Emerson Puente
*Assistant Examiner* — Steven Do
(74) *Attorney, Agent, or Firm* — Brake Hughes Bellermann LLP (57) ABSTRACT

A topology reader may determine a topology of a Non-Uniform Memory Access (NUMA) architecture including a number of, and connections between, a plurality of sockets, each socket including one or more cores and at least one memory configured to execute a plurality of threads of a software application. A core list generator may generate, for each designated core of the NUMA architecture, and based on the topology, a proximity list listing non-designated cores in an order corresponding to a proximity of the non-designated cores to the designated core. A core selector may determine, at a target core and during the execution of the plurality of threads, that the target core is executing an insufficient number of the plurality of threads, and may select a source core at the target core, according to the proximity list associated therewith, for subsequent transfer of a transferred thread from the selected source core to the target core for execution thereon.

20 Claims, 4 Drawing Sheets

(56) References Cited

OTHER PUBLICATIONS

Non-Final Office Action for U.S. Appl. No. 12/979,921, mailed Feb. 11, 2013, 26 pages.
"Long-Term Planning (PP-MP-LTP)". SAP AG, Release 4.6C, Apr. 2001, 50 pages.
"Versioned databases", IBM Corporation, Mar. 2004, 3 pages.
Gremillion, "Designing a Bloom Filter for Differential File Access", Communications of the ACM, vol. 25, No. 9, 1982, pp. 600-604.
Rappoport, "File Structure Design to Facilitate On-line Instantaneous Updating", Proceedings of the ACM SIGMOD International Conference on Management of Data, 1975, 14 pages.
Severance, et al., "Differential Files: Their Application to the Maintenance of Large Databases", ACM Transactions on Database Systems, vol. 1, No. 3, 1976, pp. 256-267.
Notice of Allowance for U.S. Appl. No. 12/979,921, mailed Aug. 19, 2013, 8 pages.
Final Office Action Response for U.S. Appl. No. 12/979,921, filed Aug. 5, 2013, 14 pages.
Final Office Action for U.S. Appl. No. 12/979,921, mailed Jun. 4, 2013, 27 pages.
Non-Final Office Action Response for U.S. Appl. No. 12/979,921, filed May 10, 2013, 12 pages.
Balla, et al, "Production Planning with SAP APO-PP/DS", Galileo Press, 2006, 43 pages.
"SAP Advanced Planning and Optimization 4.0 (SAP APO 4.0)", SAP AG, 2003, 20 pages.
Medeiros, et al, "Managing multiple representations of georeferenced elements", Proceedings of Seventh International Workshop on Database and Expert Systems Applications, 1996, pp. 364-370.

\* cited by examiner

MEMORY-AWARE SCHEDULING FOR NUMA ARCHITECTURES

TECHNICAL FIELD

This description relates to multi-core thread scheduling for non-uniform memory access (NUMA) architectures.

BACKGROUND

Parallel processing generally refers to the use of two or more processing cores to execute two or more threads of a software application (or, more generally, to execute two or more of virtually any set of processor-based tasks). For example, a software application may be required to execute a large number of operations or other tasks, such as, e.g., executing a large number of database queries, performing a large number of mathematical calculations, or performing virtually any other type of software-based tasks which may be executed at least partially independently of, and therefore in parallel with, one another. Thus, a plurality of execution threads of a software application, or other processor-based tasks, may be divided for execution thereof on a corresponding plurality of processing cores. As is known, such parallel processing of execution threads of an application by a plurality of processing cores may result in an increased speed of execution of the application as a whole, so that users of the application may be provided with results in a faster and more efficient manner.

One type of architecture used to implement such parallel processing techniques is known as a uniform memory access (UMA) architecture. As the name implies, such UMA architectures generally assume that each of the processing cores used to implement the parallel processing of the various execution threads has the same access time with respect to one or more memories on which the execution threads (or other related information) is stored.

Thus, parallel processing generally proceeds by executing a plurality of execution threads using a plurality of processing cores. Ideally, the execution threads may be distributed among the available processing cores in a substantially uniform and balanced manner. In practice, however, it may occur that such load balancing is difficult to achieve. For example, it may occur that one processing core is not currently assigned with an execution thread for execution, and thus is needlessly idle, while one or more other available processing cores is assigned a plurality of threads for execution thereon. In such situations, efficiencies and other advantages of the parallel processing architecture may be mitigated or lost, because completion of the application may be delayed while some execution threads are queued for processing at some processing cores, while other processing cores are idle or otherwise under-utilized.

In order to address such difficulties and to attempt to optimize the parallel processing of execution threads of an application, schedulers may be used to remove execution threads from an over-utilized processing core for reassignment to an idle or under-utilized processing core. For example, in such situations, an executing application thread on an over-utilized processing core may be paused, and its associated state information may be transferred for execution on the under-utilized or idle processing core. In the UMA architecture referenced above, it may be appreciated that such transfers may be executed substantially without regard for associated latencies caused by the transfer process. That is, since all processing cores have the same (i.e., uniform) access time with respect to the underlying main memory, it is possible for an under-utilized or idle core to receive execution threads from virtually any other available processing core. As a result, for example, such thread transfers may be executed simply by selecting an over-utilized processing core at random from a plurality of over-utilized processing cores, for subsequent transfer of execution threads therefrom to the under-utilized processing core.

Another type of architecture use for parallel processing is known as a non-uniform memory access (NUMA) architecture. In such architectures, the various processing cores may be associated with different memories, may be located on different chip sets or sockets, or may otherwise have variability in their access time with respect to one or more memories in which the various execution threads may be stored for execution. In such architectures, similar difficulties as those described above may occur. Specifically, for example, such NUMA architectures may experience difficulties in achieving a desired load balance, as just described. In NUMA architectures, it is possible to use the same or similar techniques as those referenced above in the context of UMA architectures to address sub-optimalities in load balancing. However, due to the non-uniform nature of memory access in the context of NUMA architectures, it may occur that an under-utilized or idle processing core may select a processing core and associated execution thread for reassignment thereto that is/are associated with a large memory latency for the transfer, relative to other processing cores executing the various execution threads within the NUMA architecture. Consequently, a relative delay may be introduced into the execution of the application as a whole, so that a full benefit of the NUMA architecture is not realized.

SUMMARY

According to one general aspect, a system may include instructions recorded on a computer-readable medium. The system may include a topology reader configured to determine a topology of a Non-Uniform Memory Access (NUMA) architecture including a number of, and connections between, a plurality of sockets, each socket including one or more cores and at least one memory configured to execute a plurality of threads of a software application, a core list generator configured to generate, for each designated core of the NUMA architecture, and based on the topology, a proximity list listing non-designated cores in an order corresponding to a proximity of the non-designated cores to the designated core, and a core selector configured to determine, at a target core and during the execution of the plurality of threads, that the target core is executing an insufficient number of the plurality of threads, and further configured to select a source core at the target core, according to the proximity list associated therewith, for subsequent transfer of a transferred thread from the selected source core to the target core for execution thereon.

According to another general aspect, a computer program product may be tangibly embodied on a computer-readable storage medium and may include instructions. When executed, the instructions may be configured to determine a topology of a Non-Uniform Memory Access (NUMA) architecture including a number of, and connections between, a plurality of sockets, each socket including one or more cores and at least one memory configured to execute a plurality of threads of a software application, generate, for each designated core of the NUMA architecture, and based on the topology, a proximity list listing non-designated cores in an order corresponding to a proximity of the non-designated cores to the designated core, determine, at a target core and during the execution of the plurality of threads, that the target core is executing an insufficient number of the plurality of threads, select a source core at the target core, according to the proximity list associated therewith, and transfer a transferred thread from the selected source core to the target core for execution thereon.

According to another general aspect, a computer-implemented method may include determining a topology of a Non-Uniform Memory Access (NUMA) architecture including a number of, and connections between, a plurality of sockets, each socket including one or more cores and at least one memory configured to execute a plurality of threads of a software application, generating, for each designated core of the NUMA architecture, and based on the topology, a proximity list listing non-designated cores in an order corresponding to a proximity of the non-designated cores to the designated core, determining, at a target core and during the execution of the plurality of threads, that the target core is executing an insufficient number of the plurality of threads, selecting a source core at the target core, according to the proximity list associated therewith, and transferring a transferred thread from the selected source core to the target core for execution thereon.

The details of one or more implementations are set forth in the accompanying drawings and the description below. Other features will be apparent from the description and drawings, and from the claims.

DETAILED DESCRIPTION

Figure 1:
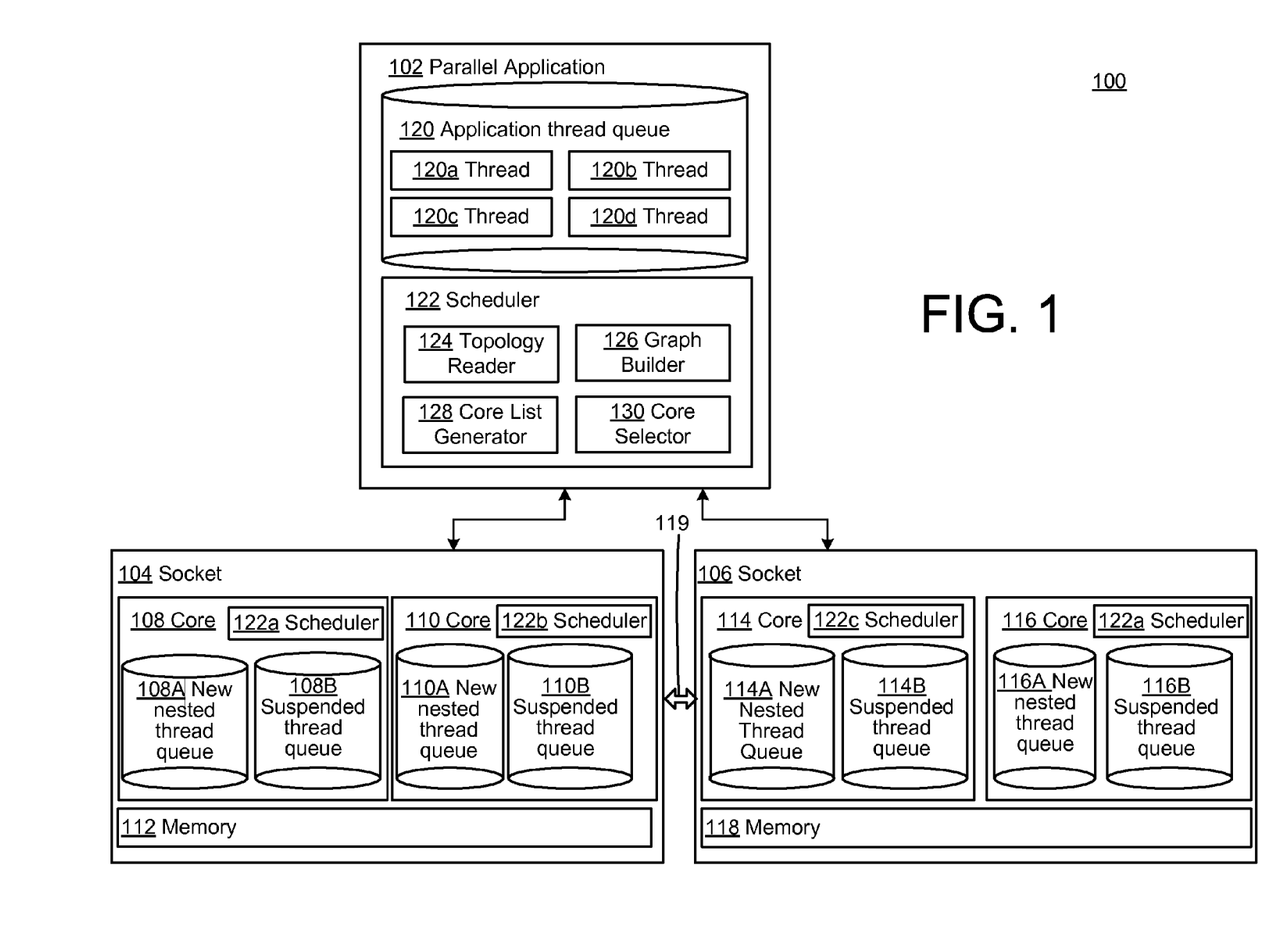
FIG. 1 is a block diagram of a system for optimized allocation of execution threads within a NUMA architecture.

FIG. 1 is a block diagram of a system 100 for providing optimized allocation of execution threads within a NUMA architecture. Specifically, the system 100 illustrates examples in which reallocation of one or more execution threads from one of a plurality of processing cores to an under-utilized or idle processing core takes into account relative memory latencies associated with transferring the execution threads from the plurality of processing cores. In this way, the under-utilized or idle processing core may receive an execution thread in a fast and efficient manner, so that the plurality of execution threads as a whole may be completed in a fast and otherwise optimized manner.

More specifically, in the example of FIG. 1, a parallel application 102 is illustrated as being executed on at least two sockets 104, 106. In this context, it may be appreciated that the parallel application 102 may be understood to represent virtually any software application which is suitable for parallel processing, e.g., which may be split into a plurality of discrete execution threads which may then be executed partially or entirely in parallel with one another, or in an otherwise overlapping fashion, so as thereby achieve a desired result or outcome of the parallel application 102 in a fast and efficient manner. In fact, almost any software application may, in theory, be processed at least to some extent in a parallel fashion. As is well known, certain types and implementations of software applications may benefit more than others from such parallel processing. Such software applications, and associated considerations related to parallel processing thereof, are generally well known, and therefore are not described here in further detail, except as may be necessary or helpful in understanding the operations of the system 100.

Meanwhile, sockets 104, 106 may generally be understood to represent associated microchips or chip sets which are designed and implemented to include a plurality of processing cores thereon. In the simplified example of FIG. 1, the socket 104 is illustrated as including a processing core 108 and a processing core 110, while, similarly, the socket 106 is illustrated as including cores 114, 116. In this regard, it may be appreciated that the term multi-core may be understood to refer to, or include, any multi-computing platform in which a plurality of processors, central processing units (CPUs), or other processing resources are available, including network/device clusters. For example, parallel query processing is known as an option for improving database performance on existing SMP/CMP (Symmetrical Multi-Processing/Chip-level Multi-Processing) servers, particularly for high performance database systems which are able to process huge volumes of data and complex queries efficiently. Thus, in the present description, it should be appreciated that the term core includes one or more unit(s) of processing power within any such environment in which multiple processing options are available.

As further illustrated in FIG. 1, the sockets 104, 106 also may include one or more memories 112, 118. Specifically, FIG. 1 illustrates an example in which the socket 104 includes a memory 112, where it may be appreciated that the memory 112 may represent one or more memories or types of memory. For example, the memory 112 may represent two or more memories, e.g., may include a main memory and one or more associated levels of cache memory. Similar comments apply to the memory 118 of the socket 106. In general, various properties and configurations of memories included in sockets such as the sockets 104, 106 are well known, and are not described here in further detail except as may be necessary to understand operations of the system 100. Similarly, it may be appreciated that the sockets 104, 106, or similar sockets, may include various components which are not specifically illustrated in the simplified example of FIG. 1, for the sake of clarity and conciseness. However, such components are generally well known to one of skill in the art.

It may be further appreciated that the sockets 104, 106 may be utilized to execute many different conventional software and hardware functions. For example, the sockets 104, 106 may be included in one or more computing devices, and may be used to implement various conventional functions thereof. For example, the sockets 104, 106 may be used to execute an operating system used by the computing device, such as, for example, the Windows operating system, MAC-OS operating system, or Linux operating system. Further, as described herein, the sockets 104, 106 may be configured to implement various other software applications in association with such an operating system, in addition to and including the parallel application 102.

To achieve such functionality, the sockets 104, 106 may be provided on one or more circuit boards, or otherwise mounted or included within the computing device in question. As referenced above, and as illustrated by a connection 119 in the example of FIG. 1, the sockets 104, 106 may be in communication with one another in order to implement the various functionalities just referenced. For example, the connection 119 may represent conventional connection technologies used in the context of NUMA architectures, some of which are discussed below in the specific example contexts of FIGS. 3A and 3B.

Thus, as described above, and as may be appreciated from the example of FIG. 1, the system 100 represents a NUMA architecture, because the various cores 108, 110 and 114, 116 do not have the same or uniform access time with respect to all memories of the system 100. For example, as is apparent from FIG. 1, the core 108 will generally have faster access time and lower latencies associated with the memory 112 as compared to access time of the core 108 with the memory 118, which is located on the separate socket 106. Consequently, if the core 108 is idle at a given point in time, it may generally be preferable to reassign an execution thread associated with the core 110 and stored within the memory 112 for execution thereof by the core 108, as compared, for example (all other factors being equal) with transfer (via the connection 119) of an execution thread associated with the core 114 and stored within the memory 118 to the memory 112 for execution by the core 108.

In practice, it may be appreciated that an actual NUMA architecture implementing the system 100 may include a large number of sockets and associated cores. Moreover, the parallel application 102 may be deployed for execution on a large number and variety of computing devices, which together may deploy a large number of variations of the basic underlying NUMA architecture illustrated in FIG. 1. For example, different numbers of cores may be included on each socket, a different number of sockets may be included within the architecture as a whole, and varying configurations and connections between the sockets may be implemented in any given context. For example, specific examples of such variations in NUMA architectures are illustrated and discussed below with respect to FIGS. 3A and 3B.

Advantageously with respect to the system 100 of FIG. 1, and as described in detail herein, the parallel application 102 may be deployed for execution into any and all such variations of NUMA architectures, yet may be configured to utilize such NUMA architectures to implement a balanced execution of execution threads, and thereby optimize a utilization of available cores of any given NUMA architecture, while completing an overall execution of the parallel application 102 in a fast and efficient manner.

In order to illustrate some of the various features and advantages just referenced, FIG. 1 provides a simplified example in which the parallel application 102 includes an application thread queue 120 which is illustrated as including four threads 120A, 120B, 120C and 120D. As described herein, and as is generally well known, the parallel application 102 may be configured to generate such threads during initial operations and/or over time during execution of the parallel application 102. For example, the parallel application 102 may generate an initial set of threads at a beginning of an execution of the parallel application 102, and may generate new or additional threads periodically or intermittently as needed during further execution of the parallel application 102. For example, execution of a particular thread may result in creation and subsequent execution of one or more related threads.

Thus, the example of FIG. 1 illustrates inclusion of a scheduler 122 within or in association with the parallel application 102, where the scheduler 122 may be configured to perform load balancing of the threads $120a$-$120d$ ... $120n$ within and among the various processing cores 108, 110, 114, 116. More specifically, the scheduler 122 may be configured to perform such load balancing in a manner which takes into account relative memory latencies which may exist when selecting a core for reallocation of an execution thread therefrom to an under-utilized or idle core. More generally, it may be appreciated that the scheduler 122 provides such load balancing in manners which optimize or otherwise take advantage or minimize drawbacks of structures and features of NUMA architectures for parallel processing.

The scheduler 122 thus refers to a process(es) whose purpose includes executing threads $120a$-$120d$ created by the application 102, as well as executing new/spawned nested threads which are created as part of the execution(s) of the application-created threads such as $120a$-$120d$. In doing so, the scheduler 122 is also responsible for switching between an active thread and an unfinished, ready-to-execute thread, e.g., when the active thread completes, or executes a synchronization mechanism that requires that the active thread be momentarily be suspended.

In the various examples that follow, it is assumed that the core 108 is currently idle, and therefore does not have an execution thread of the parallel application 102 available for current execution. Consequently, the scheduler 122 (i.e., an instance thereof) is assumed to execute on the core 108 in order to select one or more execution threads for reallocation to the core 108 from one or more of the remaining cores 110, 114, 116. Of course, it will be appreciated that such an example is merely one simplified example of operations of the system 100 of FIG. 1. For example, it will be understood that a number of execution threads executing on any one of the various cores 108, 110, 114, 116 may vary over time during execution of the parallel application 102. Consequently, at a given point in time, any one or more of the various cores 108, 110, 114, 116 may be idle or otherwise under-utilized, and may therefore execute an instance of the scheduler 122 to implement reallocation of one or more execution threads thereto from one or more of the remaining/available cores. As a matter of consistency and terminology, in the following examples, the core 108 may be described as executing an instance of the scheduler 122 to thereby construct an ordered list of the remaining cores 110, 114, 116 based on their relative proximities to the core 108, and subsequently to use the ordered proximity list to select a core for transfer of an execution thread therefrom for execution by the core 108. That is, as described, the ordered proximity list of cores may be ordered in a manner which takes into account relative NUMA latencies associated with transfer of execution threads therefrom to the core 108 for execution thereon. It will thus be understood that discussion of transference of an execution thread from one of the cores 110, 114, 116 to the core 108 for execution thereon generally contemplates that an execution thread stored in one of the memories 112, 118 and associated with current or potential execution by an associated core will be transferred to the memory 112 or otherwise allocated to the core 108 for execution.

Thus, during an initial operation of the system 100, e.g., in conjunction with an initial loading of the parallel application 102 for execution thereof, instances $122a$-$122d$ of the scheduler 122 may be deployed for execution on each of the respective/corresponding cores 108, 110, 114, 116, and may thereafter be activated/deactivated as-needed (as described herein) to optimize load balancing of thread executions within and among the cores 108, 110, 114, 116. In the simplified example(s) referenced above, the scheduler instances $122a$-$122d$ may be identical and may perform the same or similar function(s) for their corresponding cores. Of course, in practice, the instances $122a$-$122d$ need not be identical instantiations of the scheduler 122, and may not execute at the same time or perform identical function(s). For example, as described herein, the scheduler instance $122a$ may execute all of the below-described components 124-128 in order to construct proximity lists for each of the remaining cores 110, 114, 116, while all of the scheduler instances 122a-122d implement at least the component 130 in order to actually utilize a relevant proximity list to execute appropriate thread transfer(s).

As referenced above, each of the cores 108, 110, 114, 116 may proceed by constructing the above-referenced ordered proximity list of remaining cores, where each such list takes into account relative latencies between the designated core constructing an ordered list to be associated therewith, and all remaining cores. In other words, and again as a matter of terminology, the term "designated core" may be used to refer to a core for which an ordered list of remaining or non-designated cores is being constructed, or has been constructed. Of course, as may be appreciated from the above discussion, any or all of the available cores 108, 110, 114, 116 may represent a designated core in this sense at a given point in time, since each such core may be configured to construct an ordered proximity list from its own perspective, i.e., taking into account relative memory latencies for transfers from remaining or non-designating cores to the designated core in question (or, as just described, a single core may be configured to construct a relevant/corresponding proximity list for itself and for each of the remaining cores).

During subsequent operations of the system 100, e.g., during a time in which the various cores 108, 110, 114, 116 are operating to execute the various execution threads of the parallel application 102, e.g., threads 120a-120d (and spawned/nested threads created during the execution thereof), instances 122a-122d of the scheduler 122 running on each of the cores 108, 110, 114, 116 may be used to implement the various load balancing techniques described herein. For example, it may be appreciated that each available core 108, 110, 114, 116 may execute any execution threads assigned thereto, until if and when some or all of the execution threads complete and/or some of the execution threads are transferred for execution on an idle or otherwise under-utilized core. In other words, each core may generally alternate between executing an active instance of the scheduler 122 when it is necessary for that core to obtain more execution threads for processing, and actually proceeding with execution of such threads when it is not necessary for that core to obtain more execution threads for processing. During such times of active load balancing of the various execution threads, and again partly as a matter of terminology, the following examples may refer to an under-utilized or idle core which is currently executing an active instance of the scheduler 122 as a "target core" which is to receive one or more execution threads for execution thereon during the load balancing process. Conversely, the following examples may refer to remaining cores from which execution threads may be obtained for execution by the target core as "source cores" or "potential source cores." Of course, it will be appreciated that many different terminologies may be used to express the related concept that a given under-utilized or idle core may be the recipient of a transferred or otherwise reallocated execution thread from a providing core.

Therefore, as referenced above, in the following examples the core 108 is discussed as being the designated core which constructs an ordered list of the remaining cores 110, 114, 116. Further, and similarly, the core 108 may be described as the under-utilized or idle core which becomes a target core that is to receive one or more execution threads from source (or potential source) cores 110, 114, 116. Of course, any and all of the remaining cores may act as a designated core for purposes of constructing (or having constructed on its behalf) an ordered list of remaining ones of the available cores, and, similarly, any and all the available cores may act as a target or source core with respect to one another during ongoing operations of the system 100.

Thus, in the specific example in which the core 108 is initially considered to be the designated core, the scheduler 122 may execute a topology reader 124 which is configured to determine topology information describing the NUMA architecture of the system 100. That is, as referenced above, many different types of NUMA architectures exist (e.g., the examples of FIGS. 3A and 3B, below), and may vary with respect to one another in terms of a number of available cores per socket, a total number of available cores, the cache structure, and a manner in which the cores and sockets communicate with each other, to name a few example variations that may occur.

Thus, the topology reader 124 may execute to extract such information. For example, in a scenario in which the system 100 is implemented on a computing device, such as a laptop or desktop computer, it may occur that the computing device is currently executing an operating system, as referenced above. In such cases, the topology reader 124 may access relevant files of the operating system which provide information regarding the relevant topology of the underlying NUMA architecture. In other examples, the topology reader 124 may extract or otherwise determine product information regarding the computing device, and may access a network connection to thereby access topology information about the computing device which may be stored remotely and available to the topology reader 124. In still other example implementations, the topology reader 124 may obtain information about the topology during direct communications with the user of the system 100, e.g., by way of an appropriate graphical user interface (GUI). Of course, many other techniques, or combinations thereof, may be used to implement the topology reader 124.

A graph builder 126 may receive the determined topology information from the topology reader 124, and may construct a graph representing the topology. For example, the graph builder 126 may construct a graph in which the various sockets and associated cores represent nodes of the graph, while the relevant connections (e.g., the inter-socket connection 119) may be included as edges connecting the nodes of the graph, which may be weighted according to user design choice or other criteria.

A core list generator 128 may be configured to receive the graph constructed by the graph builder 126 for the designated core (e.g., the core 108), and may be configured to thereafter generate an ordered list of remaining cores (e.g., the cores 110, 114, 116), taking into account relative memory latencies there between with respect to the designated core 108. Specifically, for example, the core list generator 128 may execute Dijkstra's algorithm or other algorithm for determining a shortest path between graph nodes. As is known, Dijkstra's algorithm is a type of greedy algorithm which selects a local minimum at each step of the algorithm (here, e.g., at each node of the graph nodes). By selecting local minimums at each node, the relative global minimum(s) for a designated core with respect to each non-designated core may be obtained. Of course, other algorithms may be used, as well. For example, the Floyd-Warshall algorithm may be used. Other example algorithms, or combinations thereof, may be used in a desired manner to obtain the results described herein.

Thus, the graph generated by the graph builder 126 in representing the topology of the topology reader 124, may represent all of the available cores 108, 110, 114, 116 that are present within the NUMA architecture of the system 100 of FIG. 1, including the designated core 108 itself. Then, the core list generator 128 may be executed by each core (source core) to create an ordered list of the remaining cores ordered relative to their access time to the source core. The core list generator 128 may execute Dijkstra's algorithm or other algorithm to determine a core which has the shortest path from the designated core 108 currently executing the instance of the core list generator 128, and which therefore has the least memory latency associated therewith for transfer of an execution thread for processing by the core 108. The core list generator 128 may proceed by determining a core having a next lowest memory latency, and so on until all of the available cores of the NUMA architecture have been ordered and included appropriately within the proximity list. As referenced above, construction of such a list may be executed by and/or for each designated core included in the sockets 104, 106.

During subsequent operations of the system 100, as referenced above, it may occur that the core 108 becomes idle (i.e., does not have any execution threads available for execution). At such time, the instance 122a of the scheduler 122 executing on the core 108 may operate to determine a potential source core from which to obtain one or more execution threads for reallocation to the core 108.

More specifically, a core selector 130 may access the proximity list of the core 108, as previously generated by the core list generator 128, as described above. As described, the relevant proximity list may provide an ordered list according to which attempts should be made to identify source cores for reallocation of execution threads therefrom to the core 108.

In the example of FIG. 1, it may occur that the proximity list for the core 108 includes core 110, 114, 116, in that order. For example, as shown, the core 110 is local to the core 108 by virtue of being located on the same socket 104, and therefore may experience less memory being transferred from other sockets and a reduction of traffic at connection 119, as well as a lower latency during transfer of an execution thread therefrom to the core 108.

Consequently, the scheduler instance 122a may execute to attempt to reallocate an execution thread from the core 110 as a first potential source core. For example, the core selector 130 may determine whether the core 110 may transfer an execution thread to the core 108 without the core 110 itself becoming under-utilized or idle, or according to other transfer considerations as described herein. If so, then the core selector 130 may proceed with reallocation of a selected execution thread to the core 108.

On the other hand, if such selection of the core 110 as the source core is not currently permitted or desirable, such as when such a selection would leave the core 110 itself idle, then the core selector 130 may consult the ordered proximity list of the core 108 to determine a next potential source core, e.g., the core 114. Such core selection may continue until the core 108 is considered to be adequately utilized, or until all potential source cores in the relevant proximity list have been checked for thread reallocation. In the latter case, i.e., after all (or a desired subset) of available cores have been considered, it may occur that the core 108 ultimately consults the thread queue 120 of the parallel application 102 as a potential source of additional execution threads for a current execution. If the thread queue 120 is not available as a source of execution threads, then the core 108, under the direction of the scheduler 122, may either remain idle for a predetermined amount of time before rechecking the various potential source cores and/or the thread queue 120 for available execution threads, and/or may be (temporarily) provided to an operating system of the system 100 for reallocation to a separate and concurrently executing parallel application (not explicitly shown in FIG. 1).

In additional or alternative example implementations of the system 100 of FIG. 1, the core selector 130 may execute a more detailed decision making process when attempting to select a source core from the relevant proximity list associated with the core 108. Specifically, for example, as illustrated in the example of FIG. 1, the core 108 may include one or more private thread queues 108A, 108B that are associated therewith. That is, it may be appreciated that such queues may be stored within or associated with the memory 112, or appropriate variation thereof, although the queues 108A, 108B are illustrated within the core 108 in order to demonstrate their association therewith. Thus, it may generally be appreciated that in the core selection process of the core selector 130 described above, the core selector 130 may determine whether a core selected from the proximity list may serve as a source core for reallocation of an execution thread therefrom, by examining one or more private thread queues associated therewith.

For example, as shown, the core 110 includes thread queues 110A, 110B, while the core 114 includes queues 114A, 114B, and the core 116 includes thread queues 116A, 116B. During normal operation, execution threads from the thread queue 120 of the parallel application 102 may initially, periodically, or intermittently be distributed for execution to any of the various cores 108, 110, 114, 116.

Thereafter, as referenced above, such executing threads, during their execution, may create, cause, or spawn further threads, which are referred to herein as nested threads. Such new nested threads may be stored in corresponding new nested thread queues 108A, 110A, 114A, and 116A. Further, as shown, any executing thread may be suspended (for known reasons, some of which are described below for the sake of example), and at that point stored in a corresponding suspended thread queue 108B, 110B, 114B, and 116B.

During the core selection processes described above, it may thus be appreciated that the core selector 130 may inspect the relevant queue of a currently selected potential source core, and may determine whether it is currently appropriate or desirable to transfer one or more execution threads from the inspected queue to the target core in question (e.g., the core 108). If a given execution thread is thus selected for reallocation to the core 108, then it may be necessary to simultaneously transfer or reallocate stored state information about a current state of the execution thread that is to be transferred. Thus, it may be appreciated that a quantity or other characteristic of such stored state information may affect an overall memory latency associated with the potential reallocation of the execution thread in question. That is, for example, if a relatively large amount of state information is stored in association with a (e.g., suspended) execution thread to be transferred, then the transfer process may take longer and require more resources than if little or no state information is associated therewith. Similarly, it may be appreciated that other overhead costs may be associated with the transfer of state information associated with an execution thread. For example, it may be necessary to wait to complete one or more operations of an executing thread, so as to properly store an intermediate result before commencing transfer of the execution thread. Consequently, again, such additional operations may contribute to an overall relative cost associated with the transfer of the execution thread in question.

In order to account for such potential additional memory latencies associated with transfers of execution threads, the system 100 includes at least the two separate thread queues that are associated with each of the cores 108, 110, 114, 116.

Specifically, as shown, for example, the core 108 includes the new nested thread queue 108A and a suspended thread queue 108B. In this regard, as referenced above, it may be appreciated that execution threads may initially be assigned to each available core from the thread queue 120 of the parallel application 102. Over time, during execution of the execution threads, it may occur that new nested threads are created for execution thereof. Thus, it may be appreciated that the new nested thread queues 108A, 110A, 114A, 116A of the corresponding cores 108, 110, 114, 116 may be populated by such new nested threads. It may be further appreciated that, in general, such new nested threads may be associated with little or no state information, since it is presumed that the new nested threads, by definition, have not yet begun to execute to accumulate such state information. As a result, it may generally be faster and more straightforward to transfer such new nested threads.

In contrast, the system 100 also includes suspended thread queues 108A, 110B, 114B, 116B that are associated with corresponding cores 108, 110, 114, 116. As may be appreciated from the above description, execution threads populating the suspended thread queues 108B, 110B, 114B, 116B may generally represent, for example, execution threads which have begun to execute, but which, for a number of possible and generally well known reasons, may currently be suspended or paused. For example, it may occur that a particular execution thread requires additional data which is not yet available, and is therefore suspended until the data becomes available. In other examples, it may occur that an execution thread is prioritized lower than another execution thread, and is therefore paused until the higher priority execution thread is completed. In any case, in general, it may be appreciated that the suspended thread queues 108B, 110B, 114B, 116B may store such suspended threads, and that, as described above, such suspended threads may generally be associated with at least some amount of state information which must be transferred in association therewith during reallocation of the suspended execution in question.

Thus, during a core selection process of the core selector 130 as described above, it may occur, as in the above examples, that the core 108 becomes idle and therefore activates an associated instance 122a of the scheduler 122 for consideration of the core 108 as a potential target core for reallocation thereto of one or more execution threads from potential source cores 110, 114, 116. As also described above, during these operations, the core selector 130 may consult the relevant proximity list associated with the core 108 and generated by the core list generator 128, in order to inspect the potential source cores 110, 114, 116 in an order which has been determined to minimize potential memory latencies associated with the attempted transfer and to maximize data locality.

As described above, the core selector 130 may thus proceed by attempting to execute such a transfer from each of the available source cores 110, 114, 116, according to the order of the relevant proximity list. In specific example implementations, however, the core selector 130 may contemplate the existence of the new nested thread queues 110A, 114A, 116A, and relevant advantages in transferring execution threads therefrom to the core 108, as compared to transfer of execution threads from suspended thread queues 110B, 114B, 116B. Similarly, as just described, contemplating a preference for transfer of new threads as compared to transfer of suspended threads may leverage the fact that less state information is required to be transferred in association with new nested threads as compared to transfer of suspended threads.

Therefore, in order to make use of this difference, the core selector 130 executing in conjunction with the core 108 may make multiple attempts at inspecting the first potential source core (e.g., the potential source core 110, before moving to a second core from the relevant order proximity list, e.g., the core 114). By this strategy, and from the above description, it may be apparent that the core selector 130 may determine during one of the multiple inspections of the initial potential source core 110 that a new nested thread is available, or has become available since a most recent inspection, and is therefore available for transfer to the core 108 from the new thread queue 110A. Additionally, or alternatively, the core selector 130 may inspect each of the new nested queues 110A, 114A, 116A (perhaps multiple times each) before inspecting the suspended thread queues 110B, 114B, 116B. By employing such strategies, or combinations thereof, the core selector 130 may increase the chances that a new nested thread is transferred to the core 108, as compared to a suspended thread.

Of course, it also may occur that the suspended thread queue 110B may become populated with a suspended execution thread, even though no new execution threads are currently available within the new thread queue 110A. In such a case, it may be appreciated that again the core selector 130, by implementing the strategy described above of making multiple inspections of the first potential source core 110 before moving to the second potential source core 114, may increase the likelihood that an execution thread may be transferred from the core 110 as compared to the core 114. That is, it may occur that the additional time spent waiting during multiple inspections of the close core 110 may be more than offset by an improved memory latency associated with an actual transfer of an execution thread from the core 110 to the core 108, as compared to a similar transfer from the core 114 to the core 108.

Thus, it may be appreciated that a number of strategies may be employed by the core selector 130 in attempting to select an execution thread from the specific potential source core. For example, the core selector 130 may make multiple inspections and associated attempts to reallocate execution threads from cores listed higher in the relevant proximity list, before moving to cores listed lower in the relevant proximity list. In some such examples, the core selector 130 may inspect each core "N" number of times before moving to the next core on the proximity list. In other examples, the core selector 130 may inspect each core a decreasing number of times as compared to the previously selected core, before moving to the next core. For example, the core selector 130 may inspect the core 110 five times, the core selector 114 three times, and the core 116 a single time before inspecting the thread queue 120 and/or before returning to the core 110.

As referenced above, the core selector 130 may additionally or alternatively have explicit awareness of a distinction between the new nested thread queues 110A, 114A, 116A, as compared to associated suspended thread queues 110B, 114B, 116B. Thus, for example, the core selector 130 may implement an express preference for new threads, as compared to suspended threads, including suspended threads which are obtained by proactive suspension of currently executed threads. Of course, the above implementations are merely examples, and these and various additional examples may be implemented in conjunction with the system 100, as would be apparent to one of skill in the art.

Figure 2:
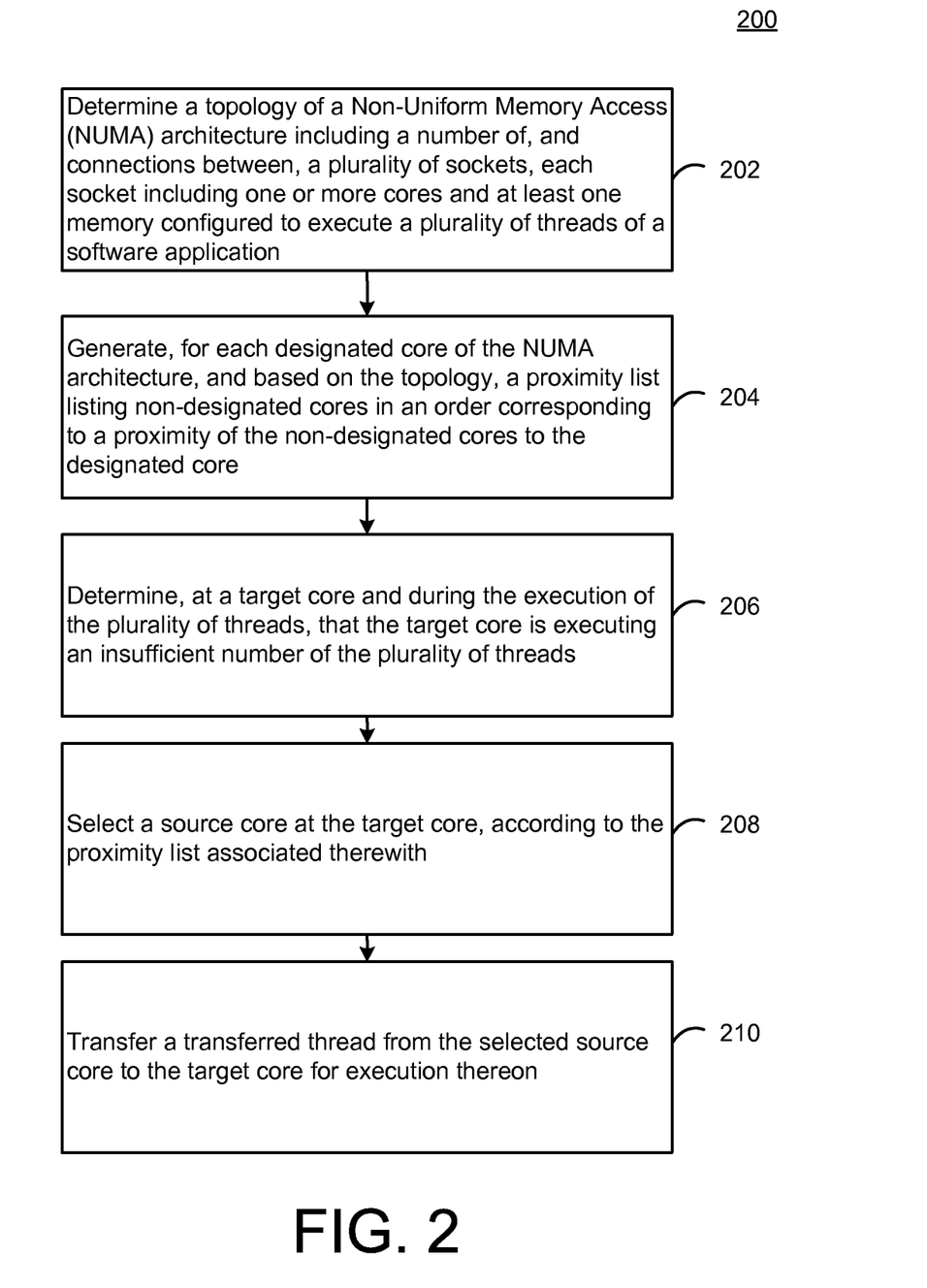
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated and described. Specifically, as shown, the operations 202-210 may be executed in a sequential order, however, it may be appreciated that the illustration is merely an example, and that various other executions are contemplated. For example, operations may be performed in a partially or completely overlapping or parallel manner, or may be performed in a different order than that shown. Further, operations may be deleted or modified, and/or additional operations may be included.

Moreover, with respect to FIG. 2, it may be appreciated that the various operations 202-210 may be executed by the parallel application 102 (e.g., by one or more instances of the scheduler 122) executing on each of the available cores 108, 110, 114, 116. That is, as described, each of the cores 108, 110, 114, 116 may be understood to execute the various operations 202-210 at a given point in time during execution of the parallel application 102 as a whole. However, as described above, description is primarily given with respect to the core 108, merely for the sake of clarity and conciseness.

Thus, in the example of FIG. 2, a topology of a non-uniform memory access (NUMA) architecture including a number of, and connections between, a plurality of sockets may be determined, where each socket includes one or more core and at least one memory configured to execute a plurality of threads of the software application (202). For example, the topology reader 124 may determine the topology of the NUMA architecture of the system 100 of FIG. 1, including the number of the sockets 104, 106, the connection 119 there between, and the associated presence of the various cores 108, 110, 114, 116 and associated memories 112, 118 (and connections there between). Specifically, as described above, the topology reader 124 may access relevant memory locations of an operating system associated with one or more computing devices on which the sockets 104, 106 are installed and executing.

For each designated core of the NUMA architecture, and based on the topology, a proximity list may be generated which lists non-designated cores in an order corresponding to a proximity of the non-designated cores to a designated core (204). For example, the core list generator 128 may generate such a proximity list for each core of the architecture of the system 100 of FIG. 1. In the examples given above, the core 108 is considered to be the designated core, for which the core list generator 128 generates the relevant proximity list which orders the cores based on a relative memory latency associated with respect to the designated core 108, e.g., by listing the cores in order of core 110, 114, 116. Of course, as described herein, the core list generator 128 may designate such a proximity list for each of the available cores 108, 110, 114, 116 as the designated core with respect to remaining cores considered to be non-designated for purposes of construction of the relative core proximity list. In this way, as described, each core 108, 110, 114, 116 may execute to later act as a potential target core for reallocation thereto of execution threads from any of the remaining non-designated cores acting as source cores for the thread reallocation.

In specific examples, as referenced herein, the core list generator 128 may generate the proximity list using a graph representing the determined topology and built by the graph builder 126. For example, as described, the core list generator 128 may use Dijkstra's algorithm as applied to the graph provided by the graph builder 126 in order to determine the shortest path through the graph from the relevant designated core to each of the remaining non-designated cores.

At a target core and during the execution of the plurality of threads, it may be determined that the target core is executing an insufficient number of the plurality of threads (206). For example, the core selector 130 may determine that the core 108 is idle during execution of the parallel application 102.

A source core may be selected at the target core, according to the proximity list associated therewith (208). For example, the core selector 130 may select the core 110 as a potential source core, based on the fact that the core 110 has been ordered as the most proximate core with respect to the core 108 as a potential target core.

As described herein, such a selection process for selecting the source core may be executed in many different ways. For example, the selection process may exhibit a preference for selecting cores which are more proximate to the potential target core, even if the preference is associated with a relative short term delay, such as when the core selector 130 is configured to wait a predetermined amount of time and re-inspect a current (more proximate) potential source core, before inspecting a less proximate potential source core. In additional or alternative examples, the core selector 130 may explicitly distinguish between, and exhibit a preference for, the new thread queue of a potential source core as compared to a corresponding suspended thread queue thereof.

Finally, in the example of FIG. 2, a transferred thread may be transferred from the selected source core to the target core for execution thereon (210). For example, the core selector 130 may transfer a selected execution thread from the suspended thread queue 110A to the core 108 for execution by the target core 108.

Figure 3A:
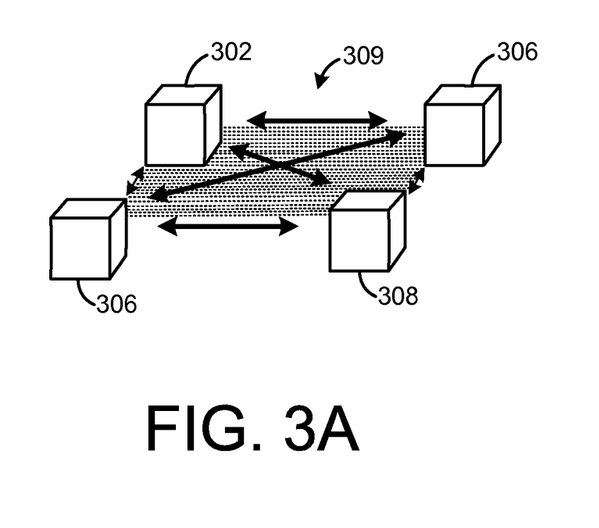
FIG. 3A is a first example of a NUMA architecture.
Figure 3B:
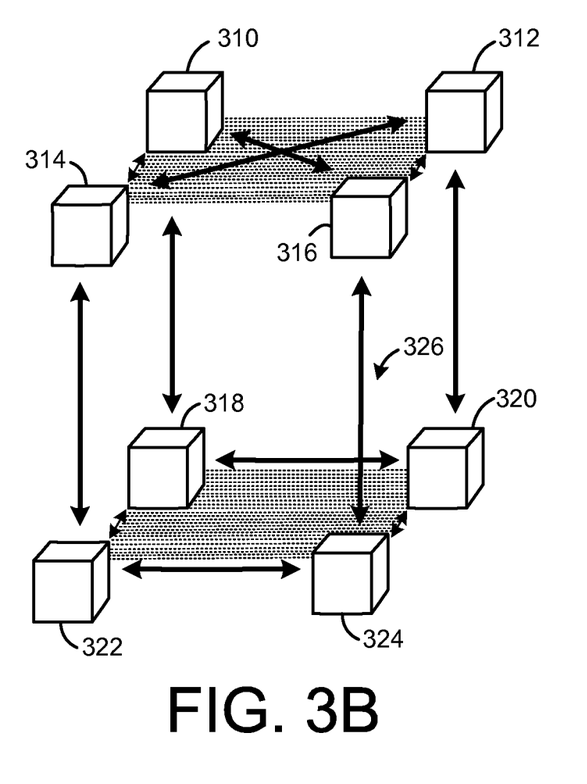
FIG. 3B is a second example of a NUMA architecture.

FIGS. 3A and 3B illustrate example NUMA architectures. In general, as described herein, NUMA architectures utilize inter-socket connections such as the connection 119 of FIG. 1. For example, the Quick Path Interconnect (QPI) connection is used in Intel products (e.g., the Nehalem and Tukwila product lines) and the HyperTransport (HT) connection is used in Advanced Micro Devices (AMD) products.

Specifically, FIG. 3A illustrates a Nehalem EX 4-socket configuration illustrating sockets 302, 304, 306, 308. In the example, each socket has 8 cores and its own memory (not explicitly illustrated in FIG. 3A). The sockets 302-308 are interconnected through QPIs 309. When a socket accesses another socket's memory, the requested memory block is transferred through the corresponding QPI link of the QPI links 309. In this 4-socket configuration, a socket can access any other socket's memory in exactly 1 QPI hop or link.

Thus, the cores in this system may be numbered to reflect how far certain cores are from others when it comes to accessing each other's memory. For example, a first socket (e.g., the socket 302) may have cores 1, 2, ..., 8, while a second socket (e.g., the socket 304) has cores 9, 10, ... 16, and so on up to the total number of 32 cores. Considering only the first two sockets for the sake of brevity the remaining (non-designated) cores may be ordered from closest to farthest. Specifically, the list below shows the proximity order for each of the 16 cores located on sockets 302 and 304. As shown, and as appreciated from the above, local cores are selected ahead of the remote cores, and each core has its own proximity list which depends on the core location in the NUMA topology.

Core 1: 2, 3, ..., 8, 9, 10, ..., 16
Core 8: 1, 2, ..., 7, 9, 10, ..., 16
Core 9: 10, 11, ..., 16, 1, 2, ..., 8
Core 16: 9, 10, ..., 15, 1, 2, ..., 8

Example Proximity Lists

Similarly, FIG. 3B illustrates an 8-socket Nehalem device. As shown, there are eight sockets 310-326, interconnected in a topology that is a variation of a cubic structure, i.e., the top two sides are switched to diagonals. In this topology, a socket has three socket neighbors and the maximum distance between two sockets is two QPI hops (in a cube the maximum distance is three hops, and by switching the top two sides to diagonals this maximum distance is reduced to two). This topology adds another level in the memory hierarchy, i.e., local memory, 1-hop memory, and 2-hop memory.

In considering only three sockets in FIG. 3B, for the sake of brevity, it may be observed that for any three sockets there are two sockets that are two hops away. The stealing order for each of the 24 cores from the three considered sockets are listed below.

Core 1: 2, 3, . . . , 8, 9, 10, . . . , 16, 17, 18, . . . , 24
Core 8: 1, 2, . . . , 7, 9, 10, . . . , 16, 17, 18, . . . , 24
Core 9: 10, 11, . . . , 16, 1, 2, . . . , 8, 17, 18, . . . , 24
Core 1 6: 9, 10, . . . , 15, 1, 2, . . . , 8, 17, 18, . . . , 24
Core 1 7: 18, 19, . . . , 24, 9, 10, . . . , 16, 1, 2, . . . , 8
Core 2 4: 17, 18, . . . , 23, 9, 10, . . . , 16, 1, 2, . . . , 8

Example Proximity Lists

Algorithm 1 illustrates pseudocode for an example algorithm for executing the core selection process of the core selector 130.

---
Pseudocode 1
---

```
0 . selection_order = Dijkstra ( core id , topology graph ) {
1 . if local queues are not empty
2 . thread = pop queue (either new or suspended)
3 . else
4 . core source = NextNumaCore ( )
5 . thread = pop core source. queue
6 . return thread
}
7 . int NextNumaCore ( ) {
8 . static int idx = 0 ;
9 . return idx++ % selection_order.size( ) ;
}
```

In the Algorithm Pseudocode 1, line 0 initializes the selection order for each core based on the obtained topological graph. Threads are selected from the potential source core private queues if available, and the NextNumaCore function representing the use of the proximity lists as described herein is used in selecting a next potential source core.

As described, Pseudocode 1 and related algorithms favor selection of the closest cores, thus avoiding selecting from farther cores. The rationale as described in detail herein in the simplified examples of FIGS. 1 and 2, is at least twofold. First, distant transfers are more expensive than closer ones (e.g., polling the remote core's private queue requires more QPI links). Second, tasks from farther cores are generally more expensive to run, e.g., bringing in the working set memory of the reallocated task and warming up the related cache may require an expensive remote transfer through QPI, as well as additional cache coherence traffic to invalidate the original (source) cache. Thus, the pseudocode and related algorithms improve data locality for load balancing processes in a multithreaded application.

As described above in the simplified examples of FIGS. 1 and 2, it is possible to further improve the basic concept of Pseudocode 1 and related algorithms by, e.g., attempting to utilize closer cores more frequently than farther cores. For example, as referenced, instead of traversing each core only once in the proximity order from closest to farthest, closer cores may checked more often than the farther ones because the closer ones have a smaller latency, and the thread migration costs are smaller.

For example, there may be five attempts to select cores from the same socket before an attempt to select a core located 1-hop QPI link away. Similarly, there could be five attempts to select sockets located 1-hop QPI link away before an attempt to select a socket located 2-hop QPI links away. In this example, cores located in one hierarchical level are favored five times more than cores located in the next hierarchical level. However, as described herein, this number may vary, and may be derived or determined, e.g., from latency ratios of the memory hierarchy. For example, Table 1 illustrates some potential memory latencies for various memory level hierarchies, expressed in numbers of processing cycles.

TABLE 1

| Level | Latency [Cycles] |
|---|---|
| L1 | [4] |
| L2 | [12] |
| L3 | [40] |
| Memory | [100] |
| 1-hop QPI | [150] |
| 2-hop QPI | [300] |

Thus, with reference to Pseudocode 1, it may be observed that the NextNumaCore function may be re-written to inspect closer cores more often than farther ones. Pseudocode 2 illustrates an example algorithm in which the core selector 130 checks local cores first, before it attempts to select a core on 1-hop away socket, and similarly, it checks all cores on 1-hop away sockets before it attempts to select a core on a 2-hop away socket.

With 8 cores per sockets, this modified version of selection order assumes that selecting closer cores is 8 times more beneficial selecting farther cores. This number is provided merely as an example, with the understanding that this number can be set for each machine based on the relevant memory hierarchy latencies. For example, the latencies for six memory levels, L1, L2, L3, local memory, 1-hop memory, and 2-hop memory, for the 8-core Nehalem EX Intel processor are shown above in Table 1. As may be observed, the cost for cores located on the same processor is 40 cycles if data is present in cache, while accessing cores at 2-hop links away takes 300 cycles or 7.5 times slower. Assuming a latency of 70 cycles for cores located on the same socket with a 50% chance that data is in L3 and 50% chance that it is in memory, then checking local cores is two times faster than checking cores on 1-hop sockets, which in turn is two times faster than checking 1-hop sockets. Taking only the selection costs as such into consideration and ignoring the thread migration costs, the example illustrates that it is beneficial to inspect two closer cores before inspecting a farther one. In this case, the stealing order for core 0 in a three socket configuration might be: 1, 2, 8, 3, 4, 9, 5, 6, 17, 7, 8, 10, 1, 2, 11, 3, 4, 18, and so on. In this example the latency ratios are 2:2:2, but this can be adapted for each machine architecture.

Pseudocode 2 illustrates example algorithm(s) for executing the above implementations, where there are two sockets (or levels) and the local cores from level one are checked N times more often than remote cores from level two.

---
Pseudocode 2
---

```
1. int NextNumaCore ( circular_list<core_id> level1,
              Circular_list<core_id> level2
              int N) {
```

-continued

Pseudocode 2

```
2.    static p1 = level1.begin( )
3.    static p2 = level2.begin( )
4.    while ( stealing_flag ) {
5.        for ( int i = 0 ; i < N; ++i ) {
6.            if ( !empty (p1) ) // found a core in level 1 with threads
7.                return p1;
8.            p1 = p1->next; // advance to next core in level 1 list
          }
9.        if ( !empty(p2) ) // found a core in level 2 with threads
10.           return p2
11.       p2 = p2->next // advance to the next core in level 2 list
      }
}
```

Figure 4:
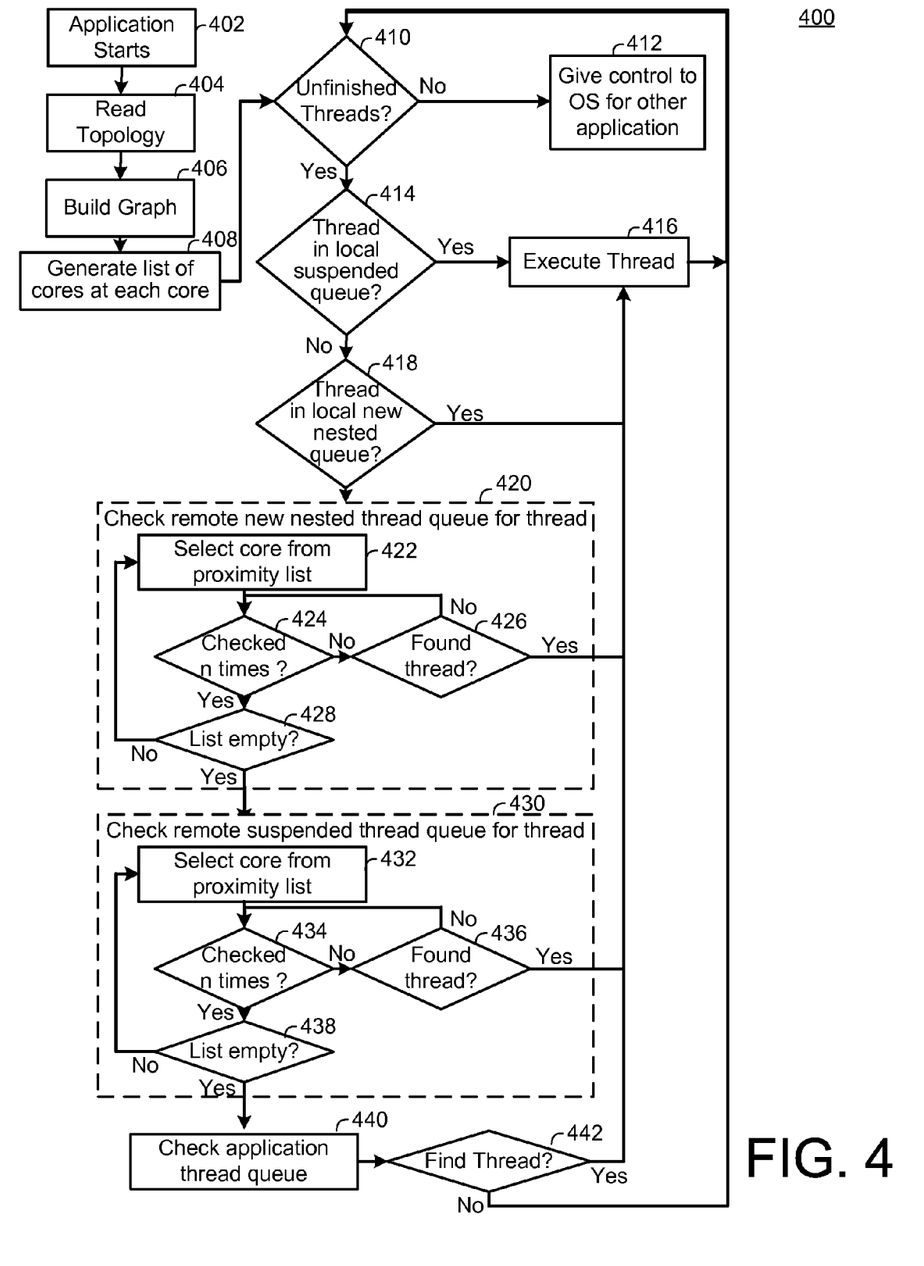
FIG. 4 is a flowchart illustrating more detailed example operations of the systems of FIGS. 1, 3A, and 3B.

FIG. 4 is a flowchart 400 illustrating detailed example operations of the system of FIGS. 1 and 3A/3B. In the example of FIG. 4, it may be assumed that the parallel application 102 starts (402) execution within one or more computing devices associated with a NUMA architecture. For example, the parallel application 102 may begin executing after an initial installation or portion thereof.

Subsequently, the topology of the computing device on which the parallel application 102 is installed may be read (404), e.g., by the topology reader 124, as described above. Based on the topology, a corresponding graph representing the topology may be built (406), e.g., by the graph builder 126.

Using the graph, a proximity list of cores may be generated at each core of the NUMA architecture (408). For example, the core list generator 128 may be executed to generate a proximity list at each designated core, and with respect to corresponding non-designated cores.

Thus, as described herein, a number of instances of the scheduler 122 may be instantiated for execution on a corresponding number of available cores within the NUMA architecture that will be used to execute the parallel application 102. At each core, during or after initial installation and instantiation of the application 102 and relevant elements thereof, the above described operations 402-408 may be executed in order to prepare the application 102 for performing parallel processing of its associated execution threads, while ensuring a desired load balancing of such execution threads during execution thereof by the various available processing cores.

After (or in conjunction with) the above described generation of core proximity lists at each of the available cores, the application 102 may begin to generate execution threads and to initially store such execution threads within the thread queue 120. As referenced above, and as illustrated in FIG. 4, the application 102 may periodically or intermittently generate such new threads during its execution. Consequently, such newly generated threads may be at least initially stored in the thread queue 120, and ultimately assigned to one or more available cores within the NUMA architecture for execution thereon. During such execution(s), as described, the executing threads may create new nested threads to be stored in corresponding new nested thread queues, and, further, various executing threads may be paused for temporary storage within corresponding suspended thread queues.

Thus, any such thread(s) may represent an unfinished thread which may be present for execution. If no such unfinished threads exist within the system (e.g., the system 100 of FIG. 1) (410), then the process may stop (e.g., temporarily until if and when a time exists when unfinished threads exist, or permanently if the application as a whole has completed processing), in which case, control of relevant core(s) may be passed to the operating system for use in executing other application(s) (412).

Otherwise, if unfinished threads exist (410), then it may be determined whether such an unfinished thread exists within a local suspended thread queue (414). For example, if the core 108 is the designated, potential target core, then the scheduler 122a may determine whether a thread exists within the local suspended thread queue 108B. If so, the determined thread may be executed (416).

Otherwise, if not (414), it may be determined whether a thread exists within the local new nested queue (418), e.g., the queue 108A. If so, execution thereof may proceed (416). If not, (418), then remote new nested thread queue(s) may be checked for an available thread (420).

That is, as referenced above, the scheduler instance 122a may exhibit a preference for threads from the new nested thread queues 110A, 114A, 116A relative to the corresponding remote suspended thread queues 110B, 114B, 116B. Specifically, in the example, the checking may proceed with selection of a core from a corresponding proximity list for the core in question, e.g., the core 108 (422). If the relevant new nested thread queue has not been checked "n" times (424), and checking proceeds and a thread is found (426), then execution may proceed (416). As described above, such repeated inspection of the new nested thread queue 110A may repeat a number "n" times, where the value of "n" may be determined in a manner designed to optimize the trade off between the delay caused by such repeated inspections and the value gained by the possibility of avoiding a need to transfer an execution thread from a more remote (and/or different type of) thread queue associated with the greater latency with respect to such a transfer.

Otherwise, if a thread is not found at that time (426), then checking may continue until "n" checks have been conducted (424). At such time, if the proximity list of cores is not empty (428), then a next core may be selected from the proximity list (422), and the process may continue as described until execution proceeds or until the proximity list is empty. In the latter case (428), remote suspended thread queues may be checked for execution threads (430), e.g., the queues 110B, 114B, 116B.

Specifically, the same process just described may be implemented again in this context. Thus, a core may be selected from the relevant proximity list (432), and if not yet checked "n" times (434) then a determination of whether a thread is found may be made (436). If so, execution may proceed (416); if not, checking may continue until a thread is found (436) or until the $n^{th}$ time is reached (434). In the latter case, if the proximity list is not empty (438), the process 432-438 may continue until execution of a thread proceeds or until the proximity list becomes empty.

In the latter case, the application thread queue 120 may be checked for available execution thread(s) (440). If a thread is found (442), execution may proceed (416). Otherwise, if at this time no unfinished threads exist (410), then the process may stop and control may be passed to the operating system (412).

As may be understood from the above description, and from the illustration of FIG. 1, it may occur that the new nested thread queue 110A is stored within, or in association with, the memory 112. Consequently, the core 108 may have substantially direct access to the execution thread for execution thereof. In other examples, however, it may be apparent that it may be necessary to perform an actual transfer of relevant memory blocks from within a relevant memory (e.g., the memory 118), over an appropriate connection (e.g., the connection 119) to the memory 112.

In the latter regard, it may generally be appreciated with respect to multiple cores on the same socket that the multiple cores may or may not be at the same distance from one another, depending on an overall design of the socket in question. For example, some multicore sockets have pairs of two cores that share the same cache, in which case the communication between the two cores that share a cache is likely to be faster than between two cores on the same chip that do not share one. For example, the Intel Dunnington chip has six cores organized in three pairs of two cores, each pair sharing an L2 cache. All six cores share an L3 cache. For these types of multicore chips the proximity order for cores within socket is also asymmetric just like in the case of sockets. Nonetheless, such core asymmetry within a chip may not generally have as strong an effect on performance as it does between sockets. For example, while between sockets the memory latency may be certain as memory blocks need to be transferred through QPIs, within a chip, cores that share an L2 cache, for example, might still need to go to the local memory controller for a communication if the data is not in L2 or L3 level cache. In this case, it may not matter that the two cores share a cache or not, the communication between them goes through memory. However, if the memory through which the two cores communicate is located in the L2 cache, the communication will generally be substantially faster.

Of course, it may be appreciated that all such operations as described herein are merely examples, and that various considerations within a particular implementation of the operations of the flowchart 400 may dictate variations of the above described operations. For example, under a different set of assumptions, then the core selector 130 may check the suspended thread queue 110D "m" number of times at operation 434, where the value for "m" may be the same or different than the value for the "m" number of times checked at operation 424.

Thus, the example of FIG. 4 illustrates a number of possible embodiments of the system of FIGS. 1 and 3A/3B. Of course, many other implementations are contemplated. For example, it may occur that the core selector 130 does not inspect all available cores from the core proximity list before checking the application thread queue 120 for available execution threads. In other example embodiments, the core selector 130 may simply check each available core from the core proximity list in the predetermined order, without executing repeated inspections of any particular selected core, and/or without necessarily having an explicit recognition of the distinction between new nested execution threads and suspended execution threads. In still other example embodiments, it may occur that the operating system may provision other cores from within the NUMA architecture for use and executing the application 102 (e.g., such as when it is determined that the application 102 is not proceeding to completion sufficiently quickly enough).

In most or all such implementations, the parallel application 102 may thus proceed in its execution until operations of the application 102 are completed, or until operations of the application 102 are otherwise halted by the user or by other circumstances. Moreover, as described, by implementing the various components and operations, and variations thereof, of FIGS. 1-4, it may observed that such a desired result of executing the application 102 may be reached in a manner which improves a load balancing of execution threads of the application 102 within and among the various available cores of the NUMA architecture being used to execute the application 102. In this way, resources of the relevant NUMA architecture may be optimized, and an experience of one or more users thereof may be enhanced.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., erasable programmable read only memory (EPROM), electrically erasable programmable read only memory (EPROM), and flash memory devices; magnetic disks, e.g., internal hard disks or removable disks; magneto-optical disks; and Compact Disk Read-only memory (CD-ROM) and Digital Versatile Disk Read-only memory (DVD-ROM) disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, the system comprising:
   a core list generator configured to generate, for each designated core of a Non-Uniform Memory Access (NUMA) architecture, and based on a topology of the NUMA architecture, a proximity list listing non-designated cores in an order corresponding to latencies for transferring state information stored in association with threads to the non-designated cores from the designated core, the core list generator being configured to generate the proximity list by taking into account a number of, and connections between, a plurality of sockets included in the NUMA architecture, each socket including one or more cores; and
   a core selector configured to determine, at a target core and during execution of a plurality of threads, that the target core is executing an insufficient number of the plurality of threads, and further configured to select a source core at the target core, according to the proximity list associated therewith, for subsequent transfer of a transferred thread and the transferred thread's associated state information from the selected source core to the target core for execution thereon.

2. The system of claim 1, further comprising a topology reader configured to access operating system files of at least one computing device implementing the NUMA architecture in order to determine the topology.

3. The system of claim 1, wherein further comprising a topology reader configured to receive the topology from a user by way of a user interface.

4. The system of claim 1, comprising a graph builder configured to receive the topology and to convert the topology into a graph.

5. The system of claim 4, wherein the core list generator is configured to generate the proximity list for the designated core using a shortest path algorithm based on the topology of the NUMA architecture.

6. The system of claim 1, wherein the proximity of the non-designated cores to the designated core is defined in terms of relative memory latencies between each of the non-designated cores and the designated core.

7. The system of claim 1, wherein the core selector is configured to determine that the target core is idle.

8. The system of claim 1, wherein the core selector is configured to select the target core including inspecting execution threads in at least one private queue thereof.

9. The system of claim 8, wherein the at least one private queue includes a new nested thread queue and a suspended thread queue, and wherein the core selector is configured to prefer the new nested thread queue when inspecting the source core.

10. The system of claim 1, wherein the core selector is configured to inspect at least one closer core of the proximity list multiple times before inspecting at least one farther core from the proximity list.

11. The system of claim 1, wherein the core selector is configured to determine that no execution threads should be transferred from available source cores, and to thereafter inspect an application thread queue of a parallel application for obtaining execution threads for execution on the target core.

12. The system of claim 1, wherein the core selector is configured to inspect at least one closer core of the proximity list more frequently than at least one farther core from the proximity list.

13. The system of claim 1, wherein the core list generator is configured to generate the proximity list listing non-designated cores in an order corresponding to latencies of access times for transferring state information stored in association with threads to the non-designated cores from the designated core.

14. The system of claim 1, wherein the core list generator is configured to generate the proximity list listing non-designated cores in an order corresponding to latencies for transferring state information stored in memory in association with threads to the non-designated cores from the designated core.

15. The system of claim 1, wherein the core selector is configured to select the target core for subsequent transfer by checking the non-designated cores in order based on the proximity list for the target core.

16. A computer program product, the computer program product being tangibly embodied on a non-transitory computer-readable storage medium and comprising instructions that, when executed, are configured to:
   generate, for each designated core of a Non-Uniform Memory Access (NUMA) architecture, and based on a topology of the NUMA architecture, a number of, and connections between, a plurality of sockets, each socket including one or more cores, a proximity list listing non-designated cores in an order corresponding to latencies for transferring state information stored in association with threads to the non-designated cores from the designated core;
   determine, at a target core and during the execution of a plurality of threads, that the target core is executing an insufficient number of the plurality of threads;
   select a source core at the target core, according to the proximity list associated therewith; and
   transfer a transferred thread and the transferred thread's associated state information from the selected source core to the target core for execution thereon.

17. The computer program product of claim 16, wherein the selection of the selected source core includes inspecting execution threads in at least one private queue thereof.

18. The computer program product of claim 17, wherein the at least one private queue includes a new nested thread queue and a suspended thread queue, and wherein the selection prefers the new nested thread queue when inspecting the source core.

19. The computer program product of claim 16, wherein the selecting includes inspecting at least one closer core of the proximity list multiple times before inspecting at least one farther core from the proximity list.

20. A computer-implemented method comprising:
   generating, for each designated core of a Non-Uniform Memory Access (NUMA) architecture, and based on a topology of the NUMA architecture, a number of, and connections between, a plurality of sockets, each socket including one or more cores, a proximity list listing non-designated cores in an order corresponding to latencies for transferring state information stored in association with threads to the non-designated cores from the designated core;

determining, at a target core and during execution of a plurality of threads, that the source target core is executing an insufficient number of the plurality of threads;

selecting a source core at the target core, according to the proximity list associated therewith; and transferring a transferred thread and state information associated with the transferred thread from the selected source core to the target core for execution thereon.

* * * * *